United States Patent
Han et al.

(10) Patent No.: US 9,112,765 B2
(45) Date of Patent: Aug. 18, 2015

(54) SELECTIVELY ENABLED QUALITY OF SERVICE POLICY

(75) Inventors: Eric K. Han, Redmond, WA (US); Shuangtong Feng, Redmond, WA (US); Yinghua Yao, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 192 days.

(21) Appl. No.: 13/443,728

(22) Filed: Apr. 10, 2012

(65) Prior Publication Data

US 2012/0246270 A1    Sep. 27, 2012

Related U.S. Application Data

(62) Division of application No. 11/327,761, filed on Jan. 6, 2006, now Pat. No. 8,170,021.

(51) Int. Cl.
*H04L 12/28*    (2006.01)
*H04L 12/26*    (2006.01)
(Continued)

(52) U.S. Cl.
CPC ............ *H04L 43/00* (2013.01); *H04L 12/2602* (2013.01); *H04L 29/0899* (2013.01); *H04L 29/08306* (2013.01); *H04L 41/0893* (2013.01); *H04L 41/5003* (2013.01);
(Continued)

(58) Field of Classification Search
CPC ................... H04L 29/08306; H04L 29/0899; H04L 49/9068
USPC ......... 370/232, 401, 392, 230, 469, 465, 463, 370/331
See application file for complete search history.

(56) References Cited

U.S. PATENT DOCUMENTS 5,822,319 A * 10/1998 Nagami et al. ................ 370/392
6,154,775 A * 11/2000 Coss et al. .................... 709/225
(Continued)

FOREIGN PATENT DOCUMENTS

CA        2506954 A1    5/2004
WO    WO 03/058868 A2    7/2003

OTHER PUBLICATIONS

Deepak Kadadia, "Tech Concepts: Enterprise QoS Policy Based Systems and Network Management," pp. 1-49.
(Continued)

*Primary Examiner* — Ricky Ngo
*Assistant Examiner* — Dewanda Samuel
(74) *Attorney, Agent, or Firm* — John Jardine; Kate Drakos; Micky Minhas

(57) ABSTRACT

A computer system that implements a quality of service policy. Information defining the quality of service policy is stored in a central location, such as a server within an enterprise. Policy management software on clients in the network download quality of service policy information from the central location to the clients. Within a client, a portion of the policy information is selected based on its applicability to a particular connection. The selected information is cached with an association to the connection so that, as datagrams are generated for transmission over the network, relevant policy information is quickly accessed for use in controlling transmission characteristics of datagrams sent using that connection. The policy information is applied on a datagram-by-datagram basis, allowing policy information to be selectively applied based on network type. Policy information may be selectively applied to those datagrams transmitted over a managed network.

20 Claims, 5 Drawing Sheets

(51) Int. Cl.
*H04L 12/861* (2013.01)
*H04L 29/08* (2006.01)
*H04L 12/24* (2006.01)
*H04L 12/801* (2013.01)
*H04L 12/813* (2013.01)
*H04L 12/851* (2013.01)

(52) U.S. Cl.
CPC .......... *H04L 41/5054* (2013.01); *H04L 47/10* (2013.01); *H04L 47/20* (2013.01); *H04L 47/24* (2013.01); *H04L 49/9068* (2013.01); *H04L 43/0852* (2013.01)

(56) References Cited

U.S. PATENT DOCUMENTS

| | | | |
|---|---|---|---|
| 6,169,748 B1 | 1/2001 | Barbas et al. | |
| 6,598,034 B1* | 7/2003 | Kloth | 706/47 |
| 6,631,122 B1 | 10/2003 | Arunachalam et al. | |
| 6,718,380 B1 | 4/2004 | Mohaban et al. | |
| 6,728,208 B1 | 4/2004 | Puuskari | |
| 6,775,280 B1 | 8/2004 | Ma et al. | |
| 6,816,456 B1 | 11/2004 | Tse-Au | |
| 6,822,940 B1 | 11/2004 | Zavalkovsky et al. | |
| 6,870,812 B1* | 3/2005 | Kloth et al. | 370/235 |
| 6,871,233 B1 | 3/2005 | Bearden et al. | |
| 6,880,005 B1* | 4/2005 | Bell et al. | 709/225 |
| 6,917,617 B2 | 7/2005 | Jin et al. | |
| 6,988,133 B1 | 1/2006 | Zavalkovsky et al. | |
| 7,027,414 B2 | 4/2006 | Walsh et al. | |
| 7,050,396 B1 | 5/2006 | Cohen et al. | |
| 7,106,737 B1 | 9/2006 | Beyda et al. | |
| 7,185,073 B1 | 2/2007 | Gai et al. | |
| 7,289,453 B2 | 10/2007 | Riedel et al. | |
| 7,349,332 B1 | 3/2008 | Srinivasan et al. | |
| 7,415,003 B1 | 8/2008 | Ogura et al. | |
| 7,448,080 B2 | 11/2008 | Karjala et al. | |
| 7,457,626 B2 | 11/2008 | Bahl | |
| 7,526,800 B2 | 4/2009 | Wright et al. | |
| 7,594,113 B2* | 9/2009 | Tan et al. | 713/169 |
| 7,636,356 B1* | 12/2009 | Melman et al. | 370/392 |
| 7,684,320 B1* | 3/2010 | Nucci | 370/229 |
| 7,703,611 B1* | 4/2010 | Appelman et al. | 209/206 |
| 7,724,740 B1* | 5/2010 | Wang et al. | 370/392 |
| 7,979,549 B2 | 7/2011 | Frost et al. | |
| 8,170,021 B2 | 5/2012 | Han et al. | |
| 8,559,428 B2* | 10/2013 | Kimura et al. | 370/392 |
| 2002/0055990 A1 | 5/2002 | Vaman et al. | |
| 2002/0122422 A1 | 9/2002 | Kenney et al. | |
| 2002/0143981 A1 | 10/2002 | DeLima et al. | |
| 2002/0169858 A1 | 11/2002 | Bellinger et al. | |
| 2003/0067874 A1 | 4/2003 | See et al. | |
| 2003/0107590 A1 | 6/2003 | Levillain et al. | |
| 2003/0115313 A1 | 6/2003 | Kanada et al. | |
| 2003/0147403 A1 | 8/2003 | Border et al. | |
| 2003/0163736 A1 | 8/2003 | Mueller et al. | |
| 2003/0182431 A1 | 9/2003 | Sturniolo et al. | |
| 2003/0204596 A1 | 10/2003 | Yadav | |
| 2004/0015599 A1 | 1/2004 | Trinh et al. | |
| 2004/0081093 A1 | 4/2004 | Haddock et al. | |
| 2004/0117613 A1 | 6/2004 | Edmondson | |
| 2004/0125797 A1 | 7/2004 | Raisanen | |
| 2004/0181598 A1 | 9/2004 | Paya et al. | |
| 2004/0228304 A1 | 11/2004 | Riedel et al. | |
| 2004/0260750 A1 | 12/2004 | Ruutu et al. | |
| 2005/0053046 A1 | 3/2005 | Wang | |
| 2005/0068924 A1 | 3/2005 | Lindskog et al. | |
| 2005/0086473 A1 | 4/2005 | Barkley et al. | |
| 2005/0088977 A1 | 4/2005 | Roch et al. | |
| 2005/0089054 A1 | 4/2005 | Giancaglini et al. | |
| 2005/0152270 A1 | 7/2005 | Gomez Paredes et al. | |
| 2005/0163079 A1 | 7/2005 | Taniuchi et al. | |
| 2005/0286470 A1* | 12/2005 | Asthana et al. | 370/331 |
| 2006/0039364 A1 | 2/2006 | Wright | |
| 2006/0088034 A1 | 4/2006 | Santitoro | |
| 2006/0114855 A1* | 6/2006 | Zheng | 370/331 |
| 2006/0149845 A1* | 7/2006 | Malin et al. | 709/228 |
| 2006/0159105 A1 | 7/2006 | Kleo | |
| 2007/0064604 A1 | 3/2007 | Chen | |
| 2007/0124433 A1 | 5/2007 | Frost et al. | |
| 2007/0237078 A1 | 10/2007 | Hundscheidt | |
| 2008/0098446 A1 | 4/2008 | Seckin et al. | |

OTHER PUBLICATIONS

Extreme Networks, Policy Based Quality of Service for Enterprise LANS, p. 1-15, 2000.
http://portal.acm.org/citation.cfm?id=abstract&coll=portal=GUIDE&CFID=55624323&CFTOKEN=51138753#abstract, downloaded Sep. 26, 2005, p. 1-2.
Network-Based Application Recognition, http://www.cisco.com/warp/public/cc/so/neso/ienesv/cxne/nbar_ov.htm, downloaded on Sep. 26, 2005, 9 pages.
Quality of Service, http://download.microsoft.com/download/win2000srv/spwp/101/NT5XP/EN-US/Quality%20of%20Service.doc, downloaded on Sep. 26, 2005, 36 pages.
RFC 3670 Information Model for Describing Network Device QoS Datapath Mechanisms, http://www.faqs/org/rfcs/rfc3670.html, downloaded Sep. 26, 2005, pp. 1-89.
Selective Flooding for Better QoS Routing; Abstract, http://web.cs.wpi.edu/~claypool/ms/hsf/report.pdf, downloaded on Sep. 26, 2005, 53 pages.
QoS Policy Framework and Its Implementation, Huang et al., Communication Technology Proceedings, 2000, WCCC-ICCT 2000, v. 1 21-25.

* cited by examiner

SELECTIVELY ENABLED QUALITY OF SERVICE POLICY

REFERENCE TO RELATED APPLICATION

This application is a divisional of U.S. patent application Ser. No. 11/327,761, entitled "SELECTIVELY ENABLED QUALITY OF SERVICE POLICY," filed on Jan. 6, 2006, the content of which is incorporated herein by reference in its entirety.

BACKGROUND

In computer systems, particularly enterprise networks, managing "quality of service" can be important. In this context, "quality of service" relates to how well users' expectations of the performance of the system are met. In a networked computer system, a user's perception, and therefore quality of service, is heavily influenced by the latency with which different types of information are transmitted over the network. For example, a network may deliver datagrams with latencies that vary between microseconds and several hundreds of milliseconds, depending on network loading. Such latencies will be adequate for many applications. However, for some applications, such as VoIP and other applications that provide an interactive experience to a user, such variations in latency will be noticeable, causing the user to perceive a low quality of service.

Poor quality of service frequently occurs when too many datagrams need to be transmitted through a network "bottleneck." Datagrams are queued at the bottleneck, creating latency. In an enterprise, a bottleneck may occur at a connection to the Internet or other similar gateway at the edges of the enterprise network. Bottlenecks can also occur within an enterprise network, such as at a trunk line connecting zones within the network.

To improve quality of service, network components can be designed to process datagrams with different priorities. Datagrams for which high latency creates a poor user experience may be assigned a higher priority. Giving priority to these datagrams keeps latency for those datagrams low, even at a bottleneck, and increases the overall quality of service. Alternatively, datagrams for which high latency has relatively little effect on user perception of the quality of the network may be transmitted with lower priority.

The ability to manage quality of service has been available in some computer systems. For example, codes, called ToS or DSCP codes, may be inserted in datagram headers. A router or other network element constructed to recognize ToS or DSCP codes will typically maintain different queues and assign a datagram to a queue based on the DSCP or ToS code. Datagrams in a queue associated with a higher priority code will be given higher priority in selecting the next datagram to process, which reduces latency for higher priority datagrams relative to lower priority datagrams.

Additionally, drivers that manage the transmission of datagrams over a network can be equipped to "throttle" datagram transmission in proportion to a setting provided with a datagram. When a throttle setting is applied to a datagram, the driver may buffer the datagram before transmitting it over the network to keep the rate of transmission below a rate specified by the throttle setting.

SUMMARY OF INVENTION

In one aspect, the invention relates to a computer system in which a quality of service policy may be implemented. The computer system has features that are useful in many environments, including computer systems that are part of enterprise networks.

In one aspect, the invention relates to a computer system that senses network characteristics and selectively applies a quality of service policy based on the sensed network characteristics. This capability allows a portable client, such as a laptop, to apply a quality of service policy while connected to an enterprise network or other managed network but to transmit without applying the quality of service policy when connected to networks outside of the enterprise network.

In another aspect, the invention relates to software for a client computer. The software includes a network interface containing a data field to indicate a network type. This field can be used in selectively applying quality of service parameters based on network type. This architecture allows quality of service parameters to be applied based on network type on a datagram-by-datagram basis with low overhead.

In another aspect, the invention relates to a method of operating a computer system with a portable client that may be connected to the network in multiple locations. In one location, which may be an office, when the client is connected to a network, a quality of service policy is applied. When connected in a second location, which may be a user's home, the client may be connected to the network and apply the quality of service policy but be connected to a second network without using the quality of service policy. This capability facilitates use of a quality of service policy in a managed network with portable clients, without inconveniencing the users of the portable clients.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
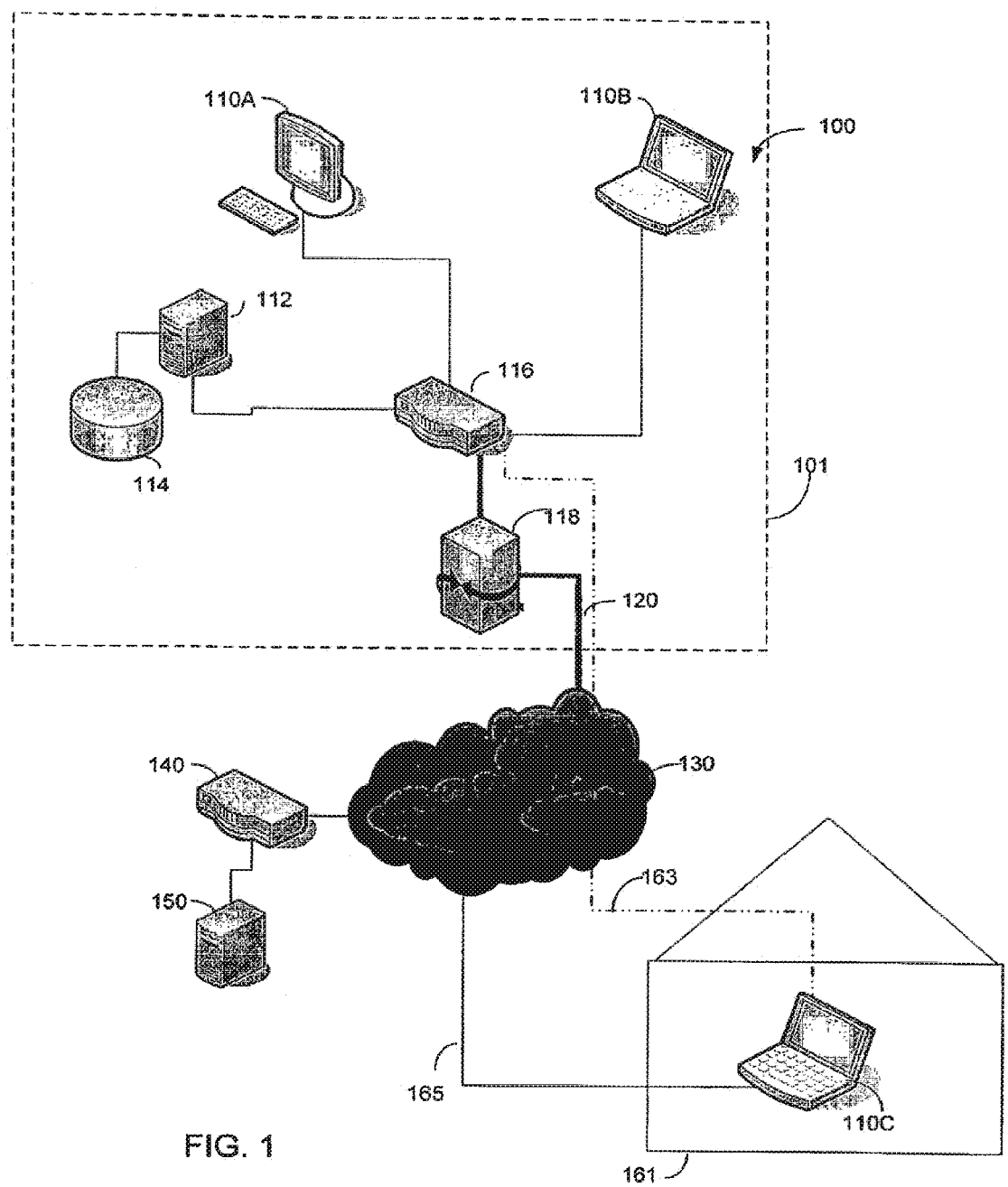
FIG. 1 is a sketch of a computer system, including an enterprise network using a to quality of service policy according to an embodiment of the invention.

A computer system that implements a quality of service policy. Information defining the quality of service policy is stored in a central location, such as a server within an enterprise. Policy management software on clients in the network download quality of service policy information from the central location to the clients. Within a client, a portion of the policy information is selected based on its applicability to a particular connection. The selected information is cached with an association to the connection so that, as datagrams are generated for transmission over the network, relevant policy information is quickly accessed for use in controlling transmission characteristics of datagrams sent using that connection. The policy information is applied on a datagram-by-datagram basis, allowing policy information to be selectively applied based on network type. Policy information may be selectively applied to those datagrams transmitted over a managed network. This approach allows a client configured to apply a quality of service policy within an enterprise network to operate without applying the policy when removed from the enterprise network.

A quality of service policy is most useful within a company or other enterprise. Though applying a quality of service policy is intended to increase user perception of network performance, it does not actually increase the amount of information that the network can transmit. Rather, applying a quality of service policy changes the allocation of network bandwidth so that higher priority transmissions are less likely to experience network delays.

But, decreasing latency for some transmissions comes at the expense of increased latency for those clients that use a policy that specifies lower priorities for their message traffic. A company or enterprise benefits from using a quality of service policy on its networks because its own higher priority traffic benefits from more available bandwidth. In other network environments, applying a quality of service policy may actually be counterproductive. Applying the policy causes a user to relinquish network bandwidth, with no offsetting benefit.

We have recognized that implementing a quality of service policy in a network having portable clients can lead to undesirable operating characteristics if the portable clients are connected to other networks. For example, many corporate computer users have laptop computers. Frequently, those users connect their laptops to an enterprise network managed by the company while at a company office. It is desirable for each laptop computer to contain software implementing a quality of service policy while connected to a corporate network. However, laptop computers are often disconnected from the enterprise network and used at home or in other settings where the laptops may be connected to other networks. Using the quality of service software while the laptop computer is connected to another network may cause the laptop computer to give up network bandwidth to other clients on the network, creating delays in messages sent from the laptop.

To avoid unnecessary delays in message transmission caused by application of a quality of service policy configured for an enterprise network when a client from that enterprise network is used in other environments, we have developed a system to implement a quality of service policy that allows transmission characteristics of datagrams to be set on a datagram-by-datagram basis. One factor in applying transmission characteristics in accordance with a quality of service policy is whether the client, at the time it transmits a datagram, is connected to a managed network. The system may use network characteristics that can be sensed by the client to determine whether the client is transmitting over a managed network, allowing the system to be simply used without express user action.

As used herein, a quality of service policy is information that defines conditions under which one or more datagram transmission characteristics are set or altered. The transmission characteristics described herein influence perceived network latency, but any suitable characteristics may be specified as a portion of a quality of service policy. Also, the quality of service policy may be specified in any suitable form and may exist in multiple forms. For example, the policy may be defined in human-readable form and may also be embodied as a computer-readable data structure.

FIG. 1 illustrates an embodiment of a computer system that employs a quality of service policy. In the example of FIG. 1, the computer system includes enterprise network 100, which is configured to employ a quality of service policy. Enterprise network 100 includes clients 110A and 110B. A client may be any device connected to the network that injects datagrams into the network for transmission to other networked devices reachable through the network.

In this context, the term "datagram" refers generally to a unit of information formatted for transmission over a network. Sometimes, datagrams are called "packets" or "messages" or may be given other names in connection with networks using specific protocols. Use of the general term "datagram" is intended to signify that the inventive concepts described herein are broadly applicable to communications regardless of specific format or network protocol.

In this example, client 110A is a desktop workstation and client 110B is a portable device, such as a laptop computer. However, any suitable computing device, whether now known or hereafter developed, may serve as a client. In this example, two clients 110A and 110B are shown for simplicity. An actual enterprise network may have many clients.

A network traditionally includes one or more switching devices that interconnect devices in the network. A switching device directs datagrams transmitted over the network to the appropriate device based on header information in the datagram. There are many types of switching devices, such as devices commonly called "switches," "hubs" and "routers." The specific network architecture and hardware is not a limitation of the invention. Accordingly, router 116 is used as an example of a switching device.

FIG. 1 shows a simplified enterprise network 100. As used herein, the term "enterprise" does not connote a network or company of any specific size, but refers generally to a group of computing devices for which a person or entity may provide control or other operational information. In the embodiment described, policy information defining operation of multiple clients is provided by a network administrator and stored on database 114.

In FIG. 1, enterprise network 100 is connected through gateway 118 to a broader network. In this example, the broader network may be the Internet 130 and the connection may be made through a trunk line 120. However, it is not necessary for enterprise network 100 be connected to a public network. For example, gateway 118 may connect enterprise network to other network zones managed by the same enterprise that manages enterprise network 100. The connection through gateway 118 allows client computers 110A and 110B within enterprise network 100 to communicate with other devices outside of enterprise network 100. For example, client computers 110A and 110E may communicate with a server 150 through router 140 that is connected to Internet 130.

FIG. 1 shows a network client 110C that may be a portable device, such as a laptop computer. A portable device may be connected to enterprise network 100 through a network drop or other access point within an office 101 operated by the enterprise that manages enterprise network 100. Because of the portable nature of client 110C, client 110C may also be connected to either enterprise network 100 or other networks, such as Internet 130, from locations remote from office 101. In the example of FIG. 1, client 110C is connected to Internet 130 while physically located in a user's home 161. Client 110C may connect to Internet 130 through an Internet service provider using an Internet connection 165. To make a connection to enterprise network 100, client 110C may use virtual private network (VPN) software to create a VPN connection 163. But, any suitable manner may be used to make a network connection.

FIG. 1 provides examples of where "bottlenecks" may occur for enterprise network 100. Switching devices, such as routers 116 and 140 and gateway 118 may create bottlenecks. Likewise, trunk line 120 could create bottlenecks. Accordingly, it may be desirable to use a quality of service policy within enterprise network 100 to reduce the impact of these bottlenecks on user perception of performance. It may also be desirable to apply the same quality of service policy to transmissions by client 110C while using VPN connection 163. However, when client 110C uses Internet connection 165, it is not necessary to apply a quality of service policy from enterprise network 100. To the contrary, applying a quality of service policy from enterprise network 100 to transmissions by client 110C through Internet connection 165 may actually detract from the experience for a user of client 110C. As described in greater detail below, client 110C may be programmed with software that selectively applies a quality of service policy based on the type of network to which a client is connected.

To facilitate the implementation of policies within enterprise network 100, enterprise network 100 also includes server 112. In this example, server 112 acts as a source of policy information stored in database 114. Clients such as 110A, 110B and 110C (when connected to enterprise network 100) connect to server 112 to download policy information from database 114. The policy information stored in database 114 may represent any type of policy information, such as configuration settings for communication software, formatting options to apply to documents or other policies.

Policy servers, such as server 112, are known in the art. For example, Microsoft, Inc. provides an enterprise application called "Active Directory" that includes a server configured to provide policy information to multiple clients in an enterprise network.

Enterprise network 100 may be conveniently implemented with an application, such as Active Directory, that would otherwise exist in an enterprise network. However, enterprise network 100 differs from conventional enterprise networks in that the policy information in database 114 relates to a quality of service policy instead of or in addition to other policy information as known in the art. In addition, devices that receive the policy information are adapted to apply the quality of service policy information.

In embodiments described herein, policy information is in the form of a set of rules. However, any suitable format for representing policy information may be used. Each rule may specify one or more conditions and one or more transmission characteristic to be used when the conditions are met. In the embodiments described herein, the transmission characteristics specified as part of a quality of service policy rule may be used to influence the relative latency of a datagram transmitted with those characteristics. The transmission characteristics may be codes, such as DSCP or ToS codes, that are inserted in message headers. Routers or other network devices may use these codes to prioritize datagrams for transmission or forwarding.

Transmission characteristics included in a policy may additionally or alternatively specify a maximum rate at which data is to be injected onto the network. A client or other device that transmits datagrams using such a characteristic may ensure the maximum rate is not exceeded by "throttling" transmission of datagrams. A device may "throttle" transmissions by buffering datagrams to be transmitted to leave sufficient time between datagrams such that the maximum rate is not exceeded. However, any desired approach to throttling may be used.

Regardless of the specific form in which the policy information is stored in database 114, once downloaded to a client computer, the client computer can implement the policy as applicable to datagrams transmitted by that client. As a client initiates transmission of a datagram, it determines which portion of the policy is applicable to that datagram and appropriately applies it. In some embodiments, a client computer may sense the type of network to which it is connected and only apply the policy while the client is connected to a managed network.

In some embodiments, a quality of service policy is implemented by software within the operating system of the client computer. Implementing a quality of service policy from within the operating system software provides advantages over the conventional approach of requiring each application that generates datagrams to specify applicable transmission characteristics. One advantage is that no changes are required to applications in order for the application to implement a quality of service policy. Therefore, a network administrator can quickly and easily set or modify a quality of service policy as a network or network usage changes. In addition, the quality of service policy can be adapted based on operating conditions of the client, allowing an easy way to selectively apply a quality of service policy when a client is connected to a managed network.

Figure 2:
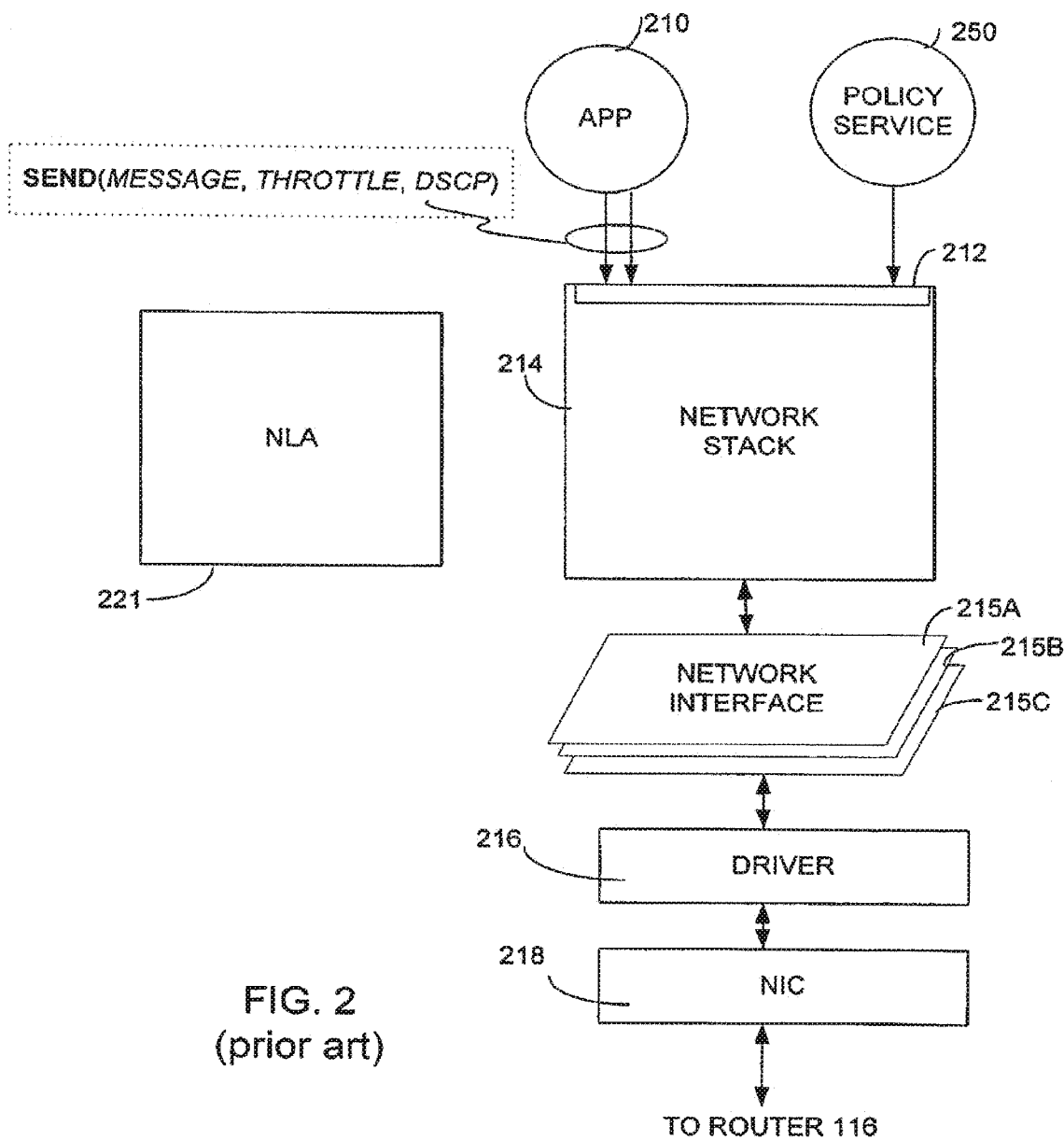
FIG. 2 is a software block diagram of a prior art client computer.

Even though the quality of service policy is implemented differently than in the prior art, conventional components for implementing a quality of service policy may nonetheless be employed. FIG. 2 provides an example of a software architecture such as may be found in client computers as known in the art. FIG. 2 shows components of an operating system as is conventionally found on a client computer.

In FIG. 2, network stack 214 has an interface 212 through which application 210 may pass a message or other information for transmission over a network. Application 210 may represent a word processor, a web browser or other application program executing on a client computer. Traditionally, a client computer includes multiple applications, but only one is shown for simplicity. Stack 214 may be a network stack as is found in an operating system, such as the WINDOWS® operating system.

Network stack 214 formats information passed through interface 212 as appropriate for transmission as one or more datagrams. Network stack 214 passes information for transmission to a network interface. FIG. 2 shows network interfaces 215A . . . 215C. A client computer may contain any number of network interfaces. A network interface is a logical entity created by network stack 214 to represent a physical or virtual network adapter. For example, client 110C may contain a network interface providing VPN connection 163 and a separate network interface providing network Internet connection 165. More generally, each network interface may provide an interface to a physical device or a "virtual" device, such as the VPN.

Network interfaces 215A, 215B and 215C pass information specifying datagrams to driver 216. Driver 216 controls network interface card (NIC) 218 to transmit the datagrams over the network.

In the embodiment of FIG. 2, interface 212 may be adapted to receive, in addition to information specifying a message to be transmitted, information specifying transmission characteristics. In this example, the transmission characteristics specified are a throttle rate and a DSCP value. This information is passed through network stack 214 to driver 216. Driver 216 inserts the DSCP value into the header portion of each datagram it sends to transmit any portion of the message initiated by application 210.

Driver 216 also receives the throttle value provided by application 210 in conjunction with a datagram to be transmitted. Driver 216 uses the throttle value to limit the rate at which datagrams are sent. If applications within a client computer are coded to generate quality of service parameters in association with messages initiated by the applications, the datagrams encapsulating those messages will be transmitted with characteristics that implement the policy.

FIG. 2 also shows that the network layer of operating system software within a client includes a network location awareness component (NLA) 221. NLA 221 may determine properties about networks to which a client computer is connected. One of the properties that NLA 221 may determine is the type of network to which the client is connected. NLA 221 may, for example, determine whether the client is connected to a managed network. Conventional approaches may be used to determine whether the client is connected to a managed network. For example, NLA 221 may identify that the client is connected to a managed network by finding a domain server on the network to which the client is connected. One way in which a domain server may be identified is by obtaining a device address for the client and attempting to extract from that address an address of a domain controller. A device address for each network connection may be obtained from each network interface 215A . . . 215C. NLA 221 may then attempt to communicate with the domain controller at the extracted address. If NLA 221 detects a domain controller, it can conclude that it is communicating over a managed network. However, any suitable method for determining whether a client is connected to a managed network may be used.

As shown in FIG. 2, a client computer may include the client portion of a policy service used within an enterprise network. Client policy service 250 may be a software module that controls the client to receive policy information from a policy server, such as policy server 112 (FIG. 1). However, in the prior art embodiment in FIG. 2, policy service 250 did not receive quality of service policy information because such information needed to be encoded as part of an application 210.

Figure 3:
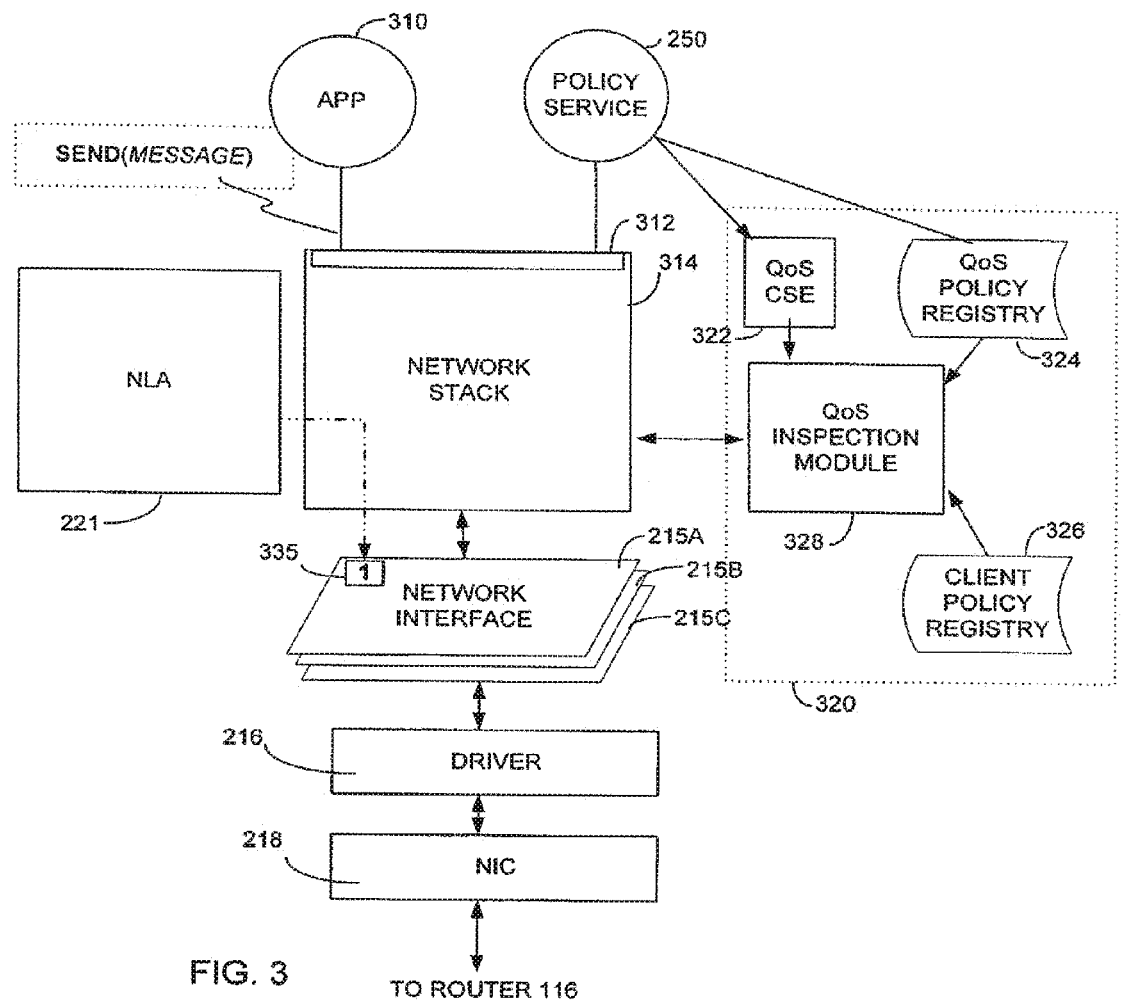
FIG. 3 is a software block diagram of a client computer adapted to implement a quality of service policy according to an embodiment of the invention.

FIG. 3 shows a software architecture according to an embodiment of the invention. In the embodiment of FIG. 3, application 310 need not be specially configured to implement a quality of service policy. Application 310 simply passes information for transmission through interface 312 to network stack 314. Operating system components apply a quality of service policy to the message, if application of the policy is appropriate. An advantage of this architecture is that messages from any application may be subject to a quality of service policy even if the application is not customized to provide quality of service information in conjunction with messages it generates.

FIG. 3 shows a software architecture for client software that includes a quality of service (QoS) policy component 320. QoS policy component 320 provides transmission characteristics for datagrams as they are being processed by stack 314. In the illustrated embodiment, stack 314 calls an interface to QoS policy component 320 each time stack 314 processes a message to be transmitted. QoS policy component 320 returns values defining transmission characteristics. The transmission characteristics may be the same as those controlled in conventional systems. In this example, the transmission characteristics are a throttle rate and a DSCP value, but any suitable transmission characteristics may be specified to implement a quality of service policy.

QoS policy component 320 may receive policy information from a centralized location, such as policy server 112 (FIG. 1). Client policy service component 250 is constructed to generally perform functions needed to obtain policy information but is customized to obtain specific types of policy information through the use of client side extensions. Here, QoS client side extension 322 is configured to provide client policy service component 250 with information needed to identify quality of service policy information on server 112. In addition, QoS client side extension 322 provides control information necessary for client side policy service component 250 to store policy information in the appropriate locations.

In the embodiment illustrated, QoS client side extension 322 identifies to client policy service component 250 that QoS policy registry 324 is the destination for downloaded quality of service policy of information. In addition, QoS client side extension 322 provides control information to QoS inspection module 328. Such control information may provide notification from QoS client side extension 322 to. QoS inspection module (328) that a policy update has occurred or otherwise coordinate action of the components.

In the embodiment illustrated, client policy service component 250 obtains policy information from server 112. To ensure each client contains up to date policy information, client policy service component 250 may periodically pull information form the server. However, any suitable timing and method of obtaining information from server 112 may be used.

As one example of another method of obtaining policy information, it is not necessary that all clients within an enterprise network obtain quality of service policy information from the same server or from a single server. Each network domain may have a domain server, which may also serve as a policy server. Further, even if domain servers are provided as a centralized repository of policy information, an enterprise network may additionally include other policy servers that provide policies for the entire network.

As another example of a further source of policy information, FIG. 3 shows that each client may have a client policy registry 326. Client policy registry 326 may be a data structure containing policy information specific to the client containing client policy registry 326. Though the invention facilitates centralization of policy information, policy information also or additionally may be placed in client policy registry 326 on a client computer in any desired way. For example, it may be placed by a user operating the client computer, by an application when it is installed on that client computer or by a network administrator.

FIG. 3 shows that client policy information is stored in a separate data structure from policy information downloaded from server 112. It is not necessary that the information be stored in a separate location or in a separate data structure. In the described embodiment, policy information from different sources is stored in a way that allows specific policies to be associated with a source so that, if a client receives inconsistent policies from different sources, it can reconcile the inconsistencies based in part on the source of the policies.

If a client obtains policy information from multiple sources, the client may reconcile the policy information to determine which policy to apply in the event of a conflict. In the described embodiment, policy information from multiple sources is reconciled according to the network hierarchy. For example, client policies, as the lowest level of the hierarchy, are applied only if not inconsistent with policies at any other level. At the other extreme, network policies are at the highest level of the hierarchy and may be applied in all instances.

In the embodiment illustrated, policies are specified as rules containing conditions. If the conditions of two rules are determined to both apply to the same transmission, then the highest priority rule is applied to that transmission. However, any suitable method of reconciling different policies may be employed.

To avoid the computational overhead of applying a QoS policy on a message-by-message or datagram-by-datagram basis, QoS policy component 320 may store policy information in a manner that allows fast identification of appropriate transmission characteristics for each transmission.

In some embodiments, fast identification of appropriate transmission characteristics is achieved by storing policy information associated with each connection formed by a client. As each connection is formed or modified, a portion of the total policy information potentially applicable to that connection is identified and cached. In the embodiment of FIG. 3, upon establishment of a connection, QoS inspection module 328 selects the policy information from QoS policy registry 324 and client policy registry 326 that is potentially applicable to the connection and caches it in a form that can be readily applied as each datagram is sent.

In this context, "connection" refers generally to predetermined information about some or all of a communication path between a client and another device, or to predetermined information about some or all of a communication endpoint on a client. The format of a connection may vary depending on the communication protocol used. For example, devices communicating using TCP protocol establish connections that are sometimes called sessions. A session involves communication from one application component in a client computer to another application component in a remote device. If the same application component in the client wants to communicate with a different application in the remote device, a different session is established. For a TCP connection, establishing a connection may allow QoS inspection module 328 to identify all aspects of a policy applicable to that connection.

On the other hand, devices communicating with a UDP protocol establish communication endpoints that describe only portions of the communication path from one application to another. When a datagram is sent using an endpoint, the datagram includes header information that identifies the application that originated the datagram and the application that is the destination for that datagram. Full information about the path is not available until the datagram is generated, but the information associated with a UDP "connection" nonetheless may allow portions of the policy to be identified as irrelevant to the connection.

The amount of information about the transmission path specified when a connection is created—or conversely the amount of information that must be specified about the transmission path when a datagram is transmitted—may dictate the amount of information about quality of service policies that needs to be stored in order to apply the policies to datagrams as they are transmitted through the connection. For a TCP connection, the full path is specified when the connection is established, which may allow all of the policy information to be evaluated to select transmission characteristics in accordance with the policy.

For a UDP connection, aspects of the policy that depend only on the source application or user name for the datagram can be evaluated. But, any aspects of the policy information that depend on the specific source or destination device, or destination applications, can not be evaluated until the datagram is generated. Thus, the portion and format of the policy information that is cached for a connection may depend on the protocol used for that connection.

In the embodiment pictured in FIG. 3, the quality of service policy is selectively applied such that transmission characteristics selected in accordance with the policy are applied to datagrams when the client is connected to a managed network. When the client is not connected to a managed network, no quality of service information is applied to datagrams. Though not described in specific examples herein, a quality of service policy may be selectively applied in other ways. For example, different quality of service policies may be applied based on whether the client is connected to a managed network.

To facilitate selective application of a quality of service policy, information about the type of network connection used for each of network interfaces 215A . . . 215C is stored in a fashion that it can be readily accessed when a datagram is being processed for transmission. In the embodiment illustrated, NLA 221 calls into network stack 314 to write information into each of the network interfaces 215A . . . 215C indicating whether the network with which the network interface interfaces is a managed network. Field 335 in network interface 215A is shown in FIG. 3 to hold information about the network type. In this example, a single bit is sufficient to identify whether a network interface interfaces to a managed network. In the examples shown, field 335 contains a value of "1," indicating that network interface 215A interfaces to a managed network.

As datagrams are generated for transmission through network interface 215A, field 335 may be accessed to determine whether transmission characteristics should be set in accordance with a quality of service policy. Similar fields for other network interfaces may be accessed when information is transmitted through those interfaces. The information in field 335 may be used in any suitable manner to control application of the quality of service policy. For example, network stack 314 may examine the value of field 335 and forgo a call to QoS policy component 320 when the value in field 335 is 0. Alternatively, network stack 314 may place a call to QoS policy component 320, which may in turn read the value in field 335. When the value in field 335 indicates that the datagram for transmission will not be transmitted over a managed network, QoS policy component 320 may specify transmission characteristics that do not limit transmission or processing of the datagram.

Figure 4A:
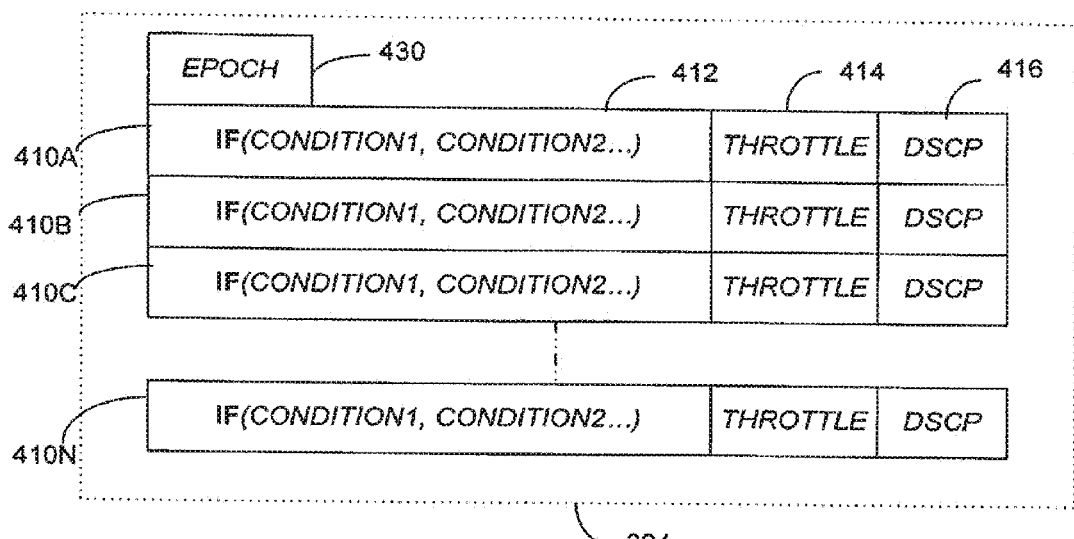
FIGS. 4A, 4B, and 4C are sketches illustrating data structures that may be used in a system implementing a quality of service policy according to an embodiment of the invention.
Figure 4B:
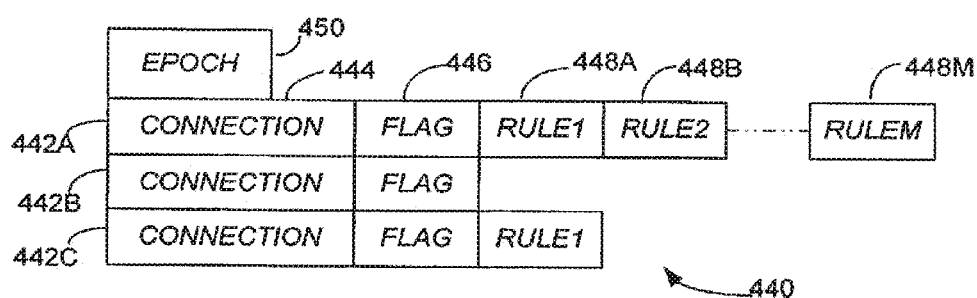
Figure 4C:
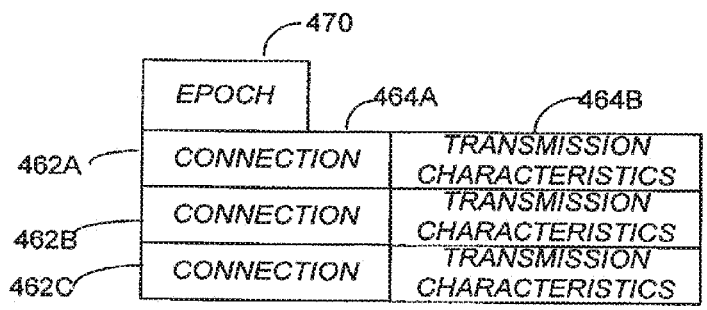

FIGS. 4A-4C illustrates how policy information may be cached to reduce the computational burden when a datagram-by-datagram application of the policy information is performed. FIG. 4A illustrates a data structure contained within QoS policy registry 324. In this example, QoS policy registry contains all of the policy information applicable to a client. Where a separate client policy registry, such as client policy registry 326, is used, the policy information in that registry may also be used in determining a portion of the policy information applicable to a connection.

In the embodiment illustrated, each policy is represented as a rule. Each rule is stored as a record in the data structure. Records 410A, 410B . . . 410N are illustrated in FIG. 4A. Each of the records 410A, 410B . . . 410N is shown to contain multiple fields.

Taking record 410A as illustrative, the record contains a condition field 412. Condition field 412 contains information defining the conditions under which the rule applies. The specific conditions for each rule depend on the quality of service policy for the applicable network. However, the conditions may specify characteristics of a datagram, such as the source device, the destination device, the source application or the destination device. In this example, any number of conditions or combinations of conditions may be specified and condition field 412 may contain any desired number of subfields to store the required information.

Each of the records also contains fields defining transmission characteristics that are to be applied when the rule is applicable. In the example of FIG. 4A, two transmission characteristics are specified. Accordingly, each record contains two transmission characteristic fields defining transmission characteristics to be used for datagrams satisfying the conditions specified in the condition field. Again taking record 410A as illustrative, a throttle field 414 and a DSCP field 416 are shown to specify transmission characteristics. These fields store a throttle value that may be provided to control driver 216 when a datagram is transmitted and a DSCP code that may be inserted into a header for a datagram.

The number of fields and type of data stored in each field is for illustration only. In clients equipped to control transmission characteristics other than a throttle rate and a DSCP code, further fields may be included to specify transmission characteristics. Alternatively, fewer fields may be included for clients that have less ability to control transmission characteristics.

FIG. 4A shows QoS policy registry 324 also includes an field 430. Field 430 stores a value indicative of the epoch or time at which QoS policy registry 324 was last updated. As described above, information in QoS policy registry 324 is periodically retrieved by policy service 250. As will be described below, the time stored in field 430 is used to ensure that current information available is used in setting transmission characteristics for a datagram.

Regardless of the form in which policy information is stored, upon establishment of a connection, a portion of the policy information is cached. FIG. 413 shows an exemplary data structure 440 containing a cache of connection information. In this example, data structure 440 represents data associated with UDP connections.

Data structure 440 contains a plurality of records, of which records 442A, 4428 and 442C are illustrated. Each of the records corresponds to a connection and contains fields providing data that allows a quality of service policy to be applied to each datagram transmitted through the connection.

Taking record 442A as illustrative, the record contains a field 444 identifying the connection. The data stored in field 444 may be in the format used by applications sending messages to identify the connection through which the message is to be transmitted. Storing data in this form reduces the computation required to select an appropriate one of the records 442A, 442B and 442C to use when applying a quality of service policy to each datagram. However, any suitable format may be used for information stored in connection field 444.

Record 442A also includes a flag field 446. For a UDP connection, the policy information stored in QoS policy registry 324 may make any number of rules applicable to a connection. In the illustrated embodiment, flag 446 provides a convenient way to identify the number of rules potentially applicable to the connection described by a record and may be used by a component applying the record to a datagram. In the illustrated embodiment, flag field 446 contains one of three values to indicate whether the record contains multiple rules applicable to a connection, a single rule applicable to a connection or no rules applicable to a connection.

Record 442A illustrates the structure of a record containing multiple rules. Record 442B illustrates the structure of a record containing no rules. Record 442C illustrates the structure of a record containing a single rule. Regardless of the number of rules, each rule may be stored in the same format.

For example, record 442A contains fields 448A . . . 448M, each storing information about one rule. Information about a rule could be stored in any convenient fashion. For example, fields such as 448A . . . 448M could contain pointers to a record in QoS policy registry 324. However, in the described embodiment, each rule is stored by copying the record in QoS policy registry 324 corresponding to the rule.

FIG. 4B shows that data structure 440 includes an field 450. Field 450 stores a value indicating the time at which data structure 440 was updated. In some embodiments, the value in field 450 is set by copying the value in field 430 when data structure 440 is created or updated. When data structure 440 is used to compute a transmission characteristic for a connection, it is possible to quickly determine whether data structure 440 was formed using the most up to date policy information by comparing the value in field 450 to the value in field 430. If the value in field 430 indicates a later time than the value in field 450, data structure 440 is potentially out of date and may be recomputed for the policy information in QoS data structure 324.

FIG. 4C provides an example of a data structure 460 that may be used to store a portion of the policy information associated with TCP connections. As with data structure 440, each connection is represented by a record in the data structure, of which records 462A, 462B and 462C are shown. Taking record 462A as illustrative, each record contains a field 464A identifying the connection. In the present example, once a connection is specified using the TCP protocol, all information needed to apply all the policy rules is available. Accordingly, storing a portion of the policy information involves storing only the transmission characteristics dictated by the policy information. Accordingly, record 462A contains a data field 464B storing the transmission characteristics associated with a connection. The transmission characteristics stored in field 464B may be stored in a suitable format. In this example, field 464B may store data in the form stored in fields 414 and 416.

FIG. 4C shows that data structure 460 also includes an field 470 storing a time value. As with field 450, field 470 is used to identify when the information in data structure 460 is out of date.

Here, data structures 440 and 460 are shown as separate data structures. Any suitable partitioning of the data may be used, including storing information about multiple types of connections in a single data structure. If information about multiple types of connections is stored in a single data structure, a field may be included for each record in the data structure indicating the type of connection, which would then indicate the number and types of fields contained in the record. Alternatively, identifying the connection may, in some instances, provide sufficient information to identify the type of connection.

Figure 5:
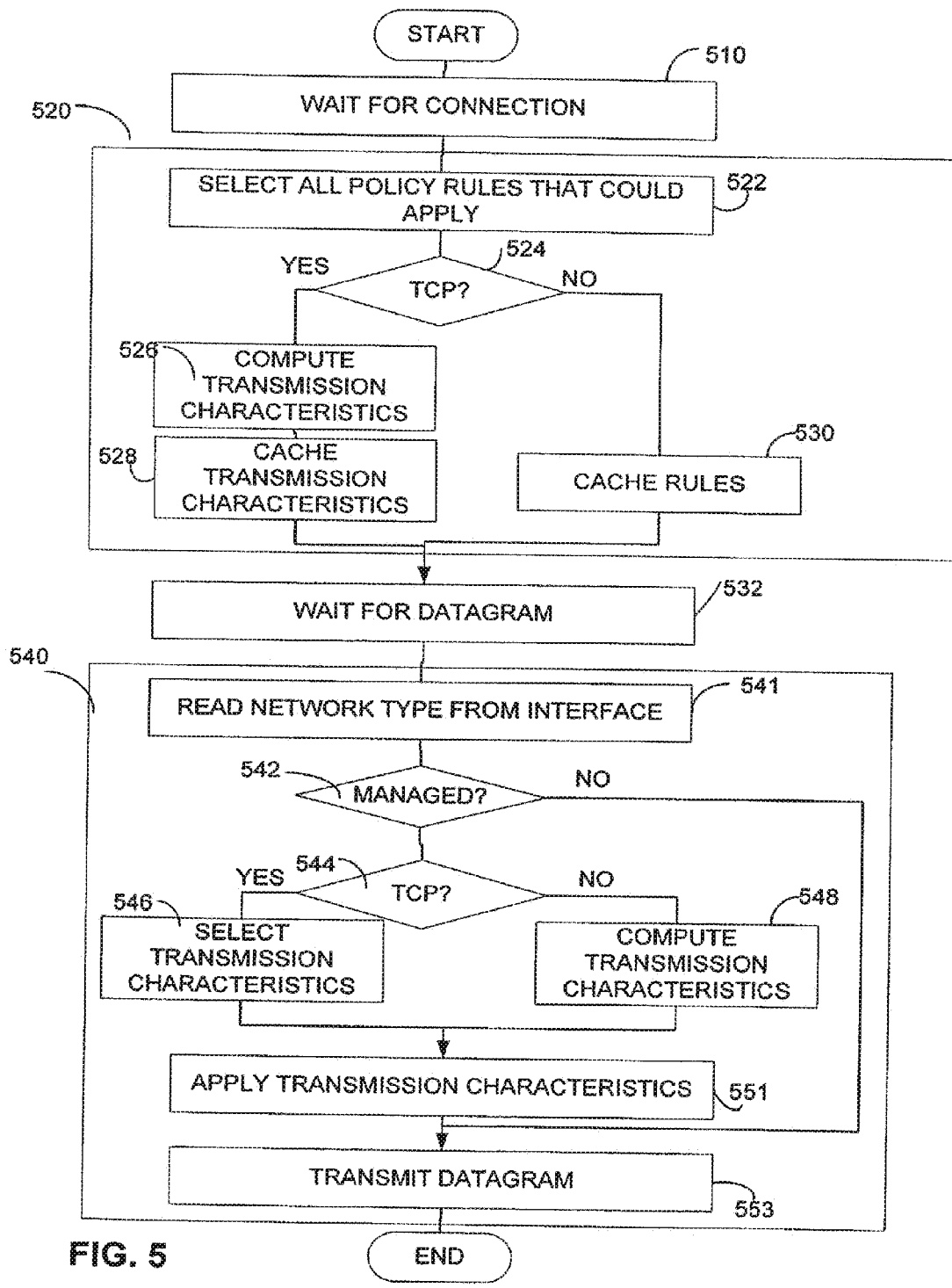
FIG. 5 is a flow chart showing a method of operation of a computer system to implement a quality of service policy according to an embodiment of the invention.

Turning now to FIG. 5, a method of operating a client computer to implement a quality of service policy is shown. In an enterprise network, each client computer may operate according to a process as illustrated in FIG. 5.

The process of FIG. 5 may be performed by software running on a client computer and may be performed by the operating system software of a client computer having the architecture as illustrated in FIG. 3 and using data structures as illustrated in FIGS. 4A . . . 4C. However, the process blocks shown in FIG. 5 represent functions that can be readily implemented in many ways by one of skill in the art and any suitable implementation may be used.

The process of FIG. 5 includes two sub processes. Sub process 520 occurs when a connection is established. Sub process 540 occurs when a datagram is transmitted. These processes are shown in FIG. 5 as sequential because a connection is established before a datagram is transmitted through that connection. However, these sub processes could each be implemented as separate processes of a multi-process device.

The overall process begins at block 510 where the software waits for a connection. In a client, a connection is generally established by a call from an application program to components within the operating system. In some embodiments, the process of FIG. 5 is initiated by the operating system component that is called to establish a connection.

When a connection is established, sub process 520 is performed to store a portion of the overall policy information that could be applicable to the connection. As described above, policy information may be available to a client from multiple sources. In some instances, a quality of service policy may be specified by thousands of rules. Processing at block 522 selects a subset of these rules. The selected rules are the ones that will always be applicable to a datagram transmitted through the connection or rules that may be applicable to such datagrams, depending on parameters associated with the datagram when it is generated.

Once the potentially applicable rules have been identified, processing continues to decision block 524 where the process flow splits based on whether the connection being established is a TCP connection. In the embodiment described, policy rules are specified based on conditions that can be evaluated at the time a TCP connection is established. Accordingly, if a TCP connection is specified, the transmission characteristics for that connection may be computed at block 526 by applying the rules selected at block 522. The transmission characteristics may then be stored for the connection. That information may, for example, be stored in a data structure such as data structure 460 (FIG. 4C), including a value identifying when the rules used to compute the cached information were last updated.

Alternatively, if the connection to be established is not a TCP connection, processing proceeds for decision block 524 to block 530. At block 530, the potentially applicable rules selected at block 522 are cached at block 530. The rules may be cached in a data structure such as data structure 440 (FIG. 4B), including a value identifying when the rules used to compute the cached information were last updated.

The process then continues to block 532 until a datagram for transmission is identified. When transmission of a datagram is initiated, the sub process 540 is performed. In some embodiments, sub process 540 may be initiated when stack 314 places a call to QoS inspection module, requesting transmission characteristics for a datagram.

As an initial step in sub process 540, the type of network through which the datagram will be transmitted is determined at step 541. In an embodiment with software architecture as pictured in FIG. 3, the type of network may be determined by reading a field, such as field 335, from a network interface through which the datagram will be transmitted.

The specific network interface through which the datagram is to be transmitted may be determined in any suitable way. For example, conventional network layer software may associate a local address with each datagram identifying a connection through which the datagram will be transmitted. The local address may identify a network interface to be used for transmitting the datagram. For TCP connections, each local address may be associated with a network interface at the time the connection is established. For UDP communications protocol, each local address may not be associated with a network interface until the datagram is generated. Regardless of the time at which an association between a local address and a specific network interface is defined, by the time processing reaches block 541 in the process illustrated in FIG. 5, information associated with the datagram will be sufficient to identify the specific network interface through which the datagram is to be transmitted. Because each network interface contains data specifying the type of network over which it transmits, identifying a network interface for each datagram allows information on the network to be obtained on a datagram-by-datagram basis.

With the information on network type, processing proceeds to decision block 542. At decision block 542, the process branches based on whether the network over which the datagram will be transmitted is managed. If the network is not managed, processing proceeds to block 543 where the datagram is transmitted, without application of a quality of service policy.

However, if the network is managed, processing proceeds to decision block 544. The process branches at decision block 544 based on the type of connection through which a datagram will be transmitted. If the connection is not a TCP connection, the process branches to block 548. At block 548, applicable transmission characteristics are computed using the rules cached at block 530. Alternatively, if the connection is a TCP connection, processing proceeds to block 546 where the transmission characteristics cached at block 528 for the connection are retrieved.

Regardless of how the transmission characteristics are determined, processing the proceeds to block 551 where the transmission characteristics are applied to the datagram. When the process of FIG. 5 is performed on a client computer having a software architecture as pictured in FIG. 3, transmission characteristics are applied by returning to stack 314 values representative of the transmission characteristics. Stack 314 then provides those values to driver 216 for use in transmission of the datagram. However, any suitable method of transmitting a message with the specified characteristics may be used.

Once the transmission characteristics are applied according to the quality of service policy, the process proceeds to step 553, where the datagram is transmitted.

Such a process allows a client computer to operate with a quality of service policy when it is connected to a managed network, regardless of whether it is located within an office 101 or a remote site, such as a user's home 161. Alternatively, when the client computer is used to connect to non-managed networks, transmission is not delayed by applying the quality of service policy. As described above, the client may automatically switch between modes in which the quality of service policy is not applied. Moreover, the client may switch between modes on a datagram-by-datagram basis with very low overhead. This capability allows datagrams sent to a managed network to be interspersed with datagrams sent to a non-managed network, with the application of the policy being driven by functions performed by the user of the client.

Having thus described several aspects of at least one embodiment of this invention, it is to be appreciated that various alterations, modifications, and improvements will readily occur to those skilled in the art.

For example, the embodiment of FIG. 1 illustrates communication within a network, but application of the invention is not limited to any specific network or network configuration. For example, though FIG. 1 shows policy information stored in database 114 connected through a server 112 to clients within enterprise network 100, no specific storage architecture for centralized policy information is required. Centralized policy information may be provided from a router or other network device or may be provided from one client to another or may be individually loaded into each client computer. Policy information may alternatively be provided from locations outside of network 100. Further, embodiments of the inventions may be constructed without the use of centralized policy information at all.

As another example, quality of service policies have been described that specify transmission characteristics to influence the latency of datagrams. The concepts described herein are applicable to policy information that influences any transmission characteristic of datagrams. Further, the concepts described herein are not limited to controlling datagram characteristics and may be applied to implement a policy that influences user perception of network operation by controlling any other operational characteristic.

Also, FIGS. 4A . . 4C illustrate data structures useful for TCP and UDP connections. Though TCP and UDP are the most common protocols in use, a system may be constructed to work with other protocols. Similar data structures can be used in connection with other protocols.

Also, though not expressly shown in FIG. 5, subprocess 540 may include checking whether updates to the qualify of service policy are available. If policy updates are available, the process may include updating the policy information and recomputing the cached policy information.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A computer-readable device adapted for use on a client computer, the computer-readable device implementing computer-executable components comprising:
    a network interface adapted to couple the client computer to a network, the network interface having associated therewith a data field adapted to store a value representative of whether the network is a managed network; and
    a first component adapted to:
        receive a datagram configured for transmission over the network;
        access the value of the data field associated with the network interface responsive to receiving the datagram;
        apply a quality of service parameter to the datagram to generate an updated datagram responsive to the access when the value of the data field associated with the network interface indicates that the network is a managed network;
        provide the updated datagram to the network interface when the value of the data field associated with the network interface indicates that the network is a managed network; and
        provide the datagram to the network interface when the value of the data field associated with the network interface indicates that the network is not a managed network.

2. The computer-readable device of claim 1, the first component comprising:
    a quality of service component adapted to provide the quality of service parameter; and a network stack component adapted to receive the datagram and to receive the quality of service parameter from the quality of service component.

3. The computer-readable device of claim 1, the computer-executable components comprising:
a second component coupled to the network interface, the second component adapted to determine whether the network is a managed network and to provide the value to the data field associated with the network interface.

4. The computer-readable device of claim 1, the computer-executable components comprising:
a second network interface adapted to couple the client computer to a second network, the second network interface having associated therewith a second data field adapted to store a second value representative of whether the second network is a second managed network.

5. The computer-readable device of claim 4, the second network interface being a VPN adapter.

6. The computer-readable device of claim 1, the computer-executable components comprising:
a driver component adapted to receive the updated datagram through the network interface and to control a transmission characteristic of the updated datagram as a function of the quality of service parameter.

7. The computer-readable device of claim 1, the network interface being a logical network adapter.

8. The computer-readable device of claim 1, the computer-executable components comprising:
a second component adapted to search the network for a domain server and to label the network as a managed network when the domain server is located per the search.

9. The computer-readable device of claim 1, the computer-executable components comprising:
a second component adapted to:
obtain a device address of the client computer;
extract an address of a domain controller from the device address;
attempt to communicate with the domain controller via the address; and
label the network as a managed network when the second component communicates with the domain controller per the attempt.

10. The computer-readable device of claim 1, the first component adapted to apply the quality of service parameter to a header of the datagram.

11. The computer-readable device of claim 1, the network interface being a physical network adapter.

12. The computer-readable device of claim 1, the computer-executable components comprising:
a second component adapted to receive a quality of service policy associated with the quality of service parameter from a policy server.

13. A method, comprising:
receiving a datagram configured for transmission over a network;
accessing, responsive to receiving the datagram, a value of a data field associated with a network interface adapted to couple a client computer to the network, the value representative of whether the network is a managed network;
applying a quality of service parameter to the datagram to generate an updated datagram when the value of the data field associated with the network interface indicates that the network is a managed network;
providing the updated datagram for transmission over the network when the value of the data field associated with the network interface indicates that the network is a managed network; and
providing the datagram for transmission over the network when the value of the data field associated with the network interface indicates that the network is not a managed network.

14. The method of claim 13, the network interface being a physical network adapter.

15. The method of claim 13, the network interface being a logical network adapter.

16. The method of claim 13, the client computer coupled to a second network via a second network interface.

17. The method of claim 13, the applying comprising applying the quality of service parameter to a header of the datagram.

18. The method of claim 13, the providing comprising transmitting the updated datagram over the network as a function of the quality of service parameter.

19. A system comprising:
one or more processors; and
memory configured to store instructions that when executed by at least some of the one or more processors perform a method, comprising:
receiving a datagram configured for transmission over a network;
searching the network for a domain server;
labeling the network as a managed network when the domain server is located per the searching;
applying a quality of service parameter to the datagram responsive to the labeling to generate an updated datagram;
providing the updated datagram for transmission over the network when the network is labeled as a managed network; and
providing the datagram for transmission over the network when the network is not labeled as a managed network.

20. The system of claim 19, the network connected to a client computer.

* * * * *